(12) United States Patent
Ro et al.

(10) Patent No.: US 7,460,506 B2
(45) Date of Patent: Dec. 2, 2008

(54) APPARATUS AND METHOD FOR TRANSMITTING AND RECEIVING A CELL IDENTIFICATION CODE IN A MOBILE COMMUNICATION SYSTEM

(75) Inventors: Jung-Min Ro, Seoul (KR); Seung-Hoon Choi, Suwon-si (KR); Seok-Hyun Yoon, Suwon-si (KR); Chang-Ho Suh, Seongnam-si (KR); Dong-Seek Park, Yongin-si (KR); Young-Kwon Cho, Suwon-si (KR)

(73) Assignee: Samsung Electronic Co., Ltd. (KR)

( * ) Notice: Subject to any disclaimer, the term of this patent is extended or adjusted under 35 U.S.C. 154(b) by 605 days.

(21) Appl. No.: 11/141,115

(22) Filed: May 31, 2005

(65) Prior Publication Data

US 2005/0265293 A1 Dec. 1, 2005

(30) Foreign Application Priority Data

May 29, 2004 (KR) .................. 10-2004-0038618

(51) Int. Cl.
*H04B 7/216* (2006.01)

(52) U.S. Cl. .................. 370/335; 370/342; 370/209; 455/561; 455/562.1; 375/149; 375/140

(58) Field of Classification Search .......... 370/335, 370/342, 209; 455/561, 562.1; 375/149, 375/140
See application file for complete search history.

(56) References Cited

U.S. PATENT DOCUMENTS

| 6,567,482 | B1 * | 5/2003 | Popovic' .................. 375/343 |
| 6,714,597 | B1 * | 3/2004 | Antonio et al. ............. 375/296 |
| 6,996,056 | B2 * | 2/2006 | Chheda et al. ............. 370/209 |
| 7,095,727 | B2 * | 8/2006 | Kim et al. .................. 370/335 |
| 7,173,958 | B2 * | 2/2007 | Ho et al. .................... 375/145 |
| 2002/0055357 | A1 * | 5/2002 | Hanada et al. ............. 455/422 |
| 2005/0009476 | A1 * | 1/2005 | Wu et al. ................... 455/101 |

* cited by examiner

*Primary Examiner*—Danh C Le
(74) *Attorney, Agent, or Firm*—The Farrell Law Firm, PC

(57) ABSTRACT

An apparatus and method for generating an octal code for identifying cells in a mobile communication system. In the octal code generating apparatus, a binary code generator generates a binary code with a predetermined minimum Hamming distance. A column permutator permutes the order of columns of the binary code in a predetermined interleaving method. A 3-bit combiner generates a plurality of codewords using the column-permuted binary code as a generator matrix and groups the bits of each of the codewords by threes. An octal code generator converts the 3-bit grouped binary codewords to octal code sequences.

8 Claims, 7 Drawing Sheets

APPARATUS AND METHOD FOR TRANSMITTING AND RECEIVING A CELL IDENTIFICATION CODE IN A MOBILE COMMUNICATION SYSTEM

PRIORITY

This application claims priority under 35 U.S.C. § 119 to an application entitled "Apparatus And Method For Transmitting And Receiving Cell Identification Code In A Mobile Communication System" filed in the Korean Intellectual Property Office on May 29, 2004 and assigned Serial No. 2004-38618, the contents of which are herein incorporated by reference.

BACKGROUND OF THE INVENTION

1. Field of the Invention

The present invention relates generally to a mobile communication system, and in particular, to an apparatus and method for transmitting and receiving a cell identification code that identifies a base station (BS) in an orthogonal frequency division multiple access (OFDMA) mobile communication system.

2. Description of the Related Art

In a typical code division multiple access (CDMA) mobile communication system, for example, an IS-95 CDMA system, a mobile station (MS) performs an initial cell search at a power-on to acquire pseudo noise (PN) code timing. A BS sends a PN code to all MSs within its coverage area on a forward pilot channel. The forward pilot channel delivers unmodulated data, which is spread with a PN code, and the MSs acquire the PN code timing from the forward pilot channel.

In a cell search in the IS-95 CDMA system, all BSs are synchronized to one another with the aid of global positioning system (GPS) satellites. The BSs use the same PN code at different offsets, for their identification. At the power-on, an MS acquires the PN code timing of its serving BS from a forward pilot channel and performs an initial cell search. During the initial cell search, the MS generally performs correlations on a received signal, shifting a search window of a size equal to the length of the PN code. The cell search lasts until a maximum correlation value is detected and the serving cell is identified by acquiring a PN code phase having the maximum correlation value.

This IS-95 CDMA system has evolved to $3^{rd}$ generation (3G) mobile communication systems including universal mobile telecommunication system (UMTS). Based on CDMA, the UMTS system is asynchronous between Node Bs. A user equipment (UE), which is equivalent to an MS in the IS-95 CDMA system in concept, also performs an initial cell search. While the IS-95 CDMA system and the UMTS system commonly work on CDMA, the former is synchronous and the latter is asynchronous. Additionally, they differ in the initial cell search.

In a cell search in the UMTS system, each Node B is assigned a cell-specific code, for identification. Given 512 cells each having one Node B, 512 Node Bs exist in the UMTS system, which are identified by their specific cell identification codes. A UE must search the 512 respective Node Bs for its serving Node B. Because the cell search is about checking, one by one, the phases of the cell identification codes of the 512 Node Bs, it takes a lot of time to search for the serving Node B. Consequently, it is inefficient to use this general cell search algorithm in which the highest correlation energy value is detected. Therefore, the UMTS system utilizes a multi-stage cell search algorithm.

In the above example, the 512 Node Bs are grouped into a predetermined number of groups, for example, 64 groups, each having 8 Node Bs. Different group identification codes are assigned to the 64 respective groups and the 8 Node Bs of each group are identified by spreading codes (or scrambling codes) used for their common pilot channels (CPICHs). Therefore, the UE first acquires a Node B group and then identifies a Node B by correlating a received CPICH with the scrambling codes of the Node Bs in the Node B group.

For the UMTS system, site selection diversity transmission (SSDT) has been proposed. Herein, the term "site" is interchangeable with "BS" and "cell" in its meaning.

The SSDT is a macro-diversity method to be used in a soft handover mode, activated by the system. In an SSDT procedure, the UE selects a "primary cell" among the cells of an active set, all other cells being classed "non-primary". A main objective of the SSDT is to transmit on the downlink from the best cell (hereinafter, referred to as the primary cell), thus reducing the interference caused by multiple transmissions in a soft handover mode.

Each active cell that transmits at or above a predetermined power level is assigned a temporary identification. The UE periodically measures the reception levels of common pilots transmitted by the active cells and selects a cell with the highest pilot power as a primary cell. The non-primary cells then switch off their transmit power by the UE. The temporary identification of the primary cell is used as a site selection signal being a Hadamard code-based binary sequence of a predetermined bit length.

As described above, many binary codes are used for cell identification, such as PN codes and Hadamard codes. Generally, the performance of a cell identification code depends on a maximum auto-correlation, a maximum cross-correlation, or a minimum Hamming distance. Accordingly, a cell identification code must be designed that maximizes the maximum auto-correlation, minimizes the maximum cross-correlation, or maximizes the minimum Hamming distance.

FIG. 1 is a schematic block diagram of an apparatus for transmitting a cell identification code in a Node B. Referring to FIG. 1, a cell identification code generator 105 generates a scrambling code or a spreading code as a cell identification code in a predetermined method. A scrambler/spreader 103 scrambles/spreads input data with the scrambling/spreading code. The scrambling/spreading code itself is transmitted over a stream of all Is or over data through scrambling/spreading.

As described above, a cell identification code is a PN code or a Hadamard code and acquisition of the cell identification code of a serving cell includes searching for a code having a maximum auto-correlation value. In the UMTS system, a UE correlates a received CPICH signal with a plurality of PN codes (or scrambling codes) and selects correlation values equal to or greater than a threshold, to thereby acquire the cell identification code of a serving Node B. For a fast cell search, the UE may be provided with a plurality of correlators. For example, the UE is equipped with N correlators 210 to 270 in the case illustrated in FIG. 2. All correlators operate in the same manner and thus the operation of the first correlator 210 will be described by way of example.

FIG. 2 is a schematic block diagram of an apparatus for receiving a cell identification code in a UE. Referring to FIG. 2, upon receipt of a CPICH signal, its I- and Q-channel components RX_I and RX_Q are provided to a decimator 211 of the first correlator 210. The decimator 211 selects predetermined samples from the I- and Q-channel components RX_I and RX_Q at a timing for cell search, and outputs one sample per chip to a descrambler 213. The descrambler 213 descrambles the signal received from the decimator 211 with a scrambling code & symbol pattern generated from a scrambling code & symbol pattern generator 215 and provides the descrambled I-channel component to a first primary accumulator 217 and the descrambled Q-channel component to a second primary accumulator 219. The primary accumulators 217 and 219 accumulate the I- and Q-channel components, respectively, a predetermined number of times. An energy calculator 221 squares the I-channel and Q-channel accumulations and sums the squares, thereby calculating a correlation energy. A secondary accumulator 223 accumulates the correlation energy a predetermined number of times.

All other correlators calculate correlation energies in the same manner as the first correlator 210. A maximum value detector 225 compares the correlation energies received from the first to $N^{th}$ correlators 210 to 270 each with a threshold. If there is at least one correlation energy at or above the threshold, the maximum value detector 225 determines that it has succeeded in the cell search.

Mobile communication technology has recently evolved to $4^{th}$ generation (4G) mobile communications. More specifically, the OFDMA system, which attracts more interest as a promising 4G mobile communication system, uses pilot subcarriers for cell identification, as compared to the systems described above. Data subcarriers and pilot subcarriers are spread with orthogonal codes and different orthogonal codes are used in spreading pilot subcarriers for different Node Bs, for Node B identification. The number of identifiable Node Bs is limited by the spreading factor (SF) of the orthogonal codes used. To identify more Node Bs, an entire time-frequency area assigned to each Node B is divided into smaller time-frequency areas each being assigned a different spreading code for pilot subcarriers, and a Node B is identified by a sequence of orthogonal codes used for pilot subcarriers. This method advantageously enables even sector identification as well as Node B identification.

An orthogonal code used for spreading can be detected through correlation, after despreading at a receiver. Because pilot subcarriers are transmitted with high power relative to data subcarriers, the receiver sets an orthogonal code having the highest correlation value as one for a pilot subcarrier.

As described above, many communication systems use an orthogonal code as a cell identification code. However, the orthogonal code is susceptible to errors over a channel, thereby degrading cell identification performance. In this context, the receiver must use a cell identification code that maximizes an auto-correlation value in order to improve the cell identification performance. Accordingly, a cell identification code may be transmitted at a high power level, but the increase of transmit power may interfere with signals from neighboring Node Bs and increase hardware complexity and hardware cost in the transmitter and the receiver.

SUMMARY OF THE INVENTION

Therefore, the present invention has been designed to substantially solve at least the above problems and/or disadvantages and to provide at least the advantages below. Accordingly, an object of the present invention is to provide an apparatus and method for generating a cell identification code with excellent performance in identifying Node Bs in a mobile communication system.

Another object of the present invention is to provide an apparatus and method for generating a cell identification code with excellent performance in identifying Node Bs in an orthogonal frequency division multiple access-code division multiplexing (OFDMA-CDM) mobile communication system.

A further object of the present invention is to provide an apparatus and method for demodulating a cell identification code used for Node B identification in a mobile communication system.

Still another object of the present invention is to provide an apparatus and method for generating an optimum cell identification code that minimizes a maximum cross-correlation and maximizes a minimum Hamming distance.

The above objects are achieved by providing an apparatus and method for generating an octal code used to identify cells in a mobile communication system.

According to one aspect of the present invention, in an apparatus for transmitting a cell identification code in BS in a mobile communication system in which cells are identified using an octal code, a code generator generates an octal code sequence assigned to the BS. A scrambler scrambles transmission data with the octal code sequence. The octal code has a minimum Hamming distance equal to or above 10, generated using a linear binary code with a minimum Hamming distance equal to or above 16 as a generator matrix.

According to another aspect of the present invention, in an apparatus for transmitting a cell identification code in BS in a mobile communication system in which cells are identified using an octal code, a code generator generates an octal code sequence assigned to the BS. A spreader spreads transmission data with the octal code sequence. The octal code has a minimum Hamming distance equal to or above 10, generated using a linear binary code with a minimum Hamming distance equal to or above 16 as a generator matrix.

According to a further aspect of the preset invention, in an apparatus for generating an octal code used to identify cells in a mobile communication system, a binary code generator generates a binary code with a predetermined minimum Hamming distance. A column permutator permutes the order of columns of the binary code in a predetermined interleaving method. A 3-bit combiner generates a plurality of codewords using the column-permuted binary code as a generator matrix and groups the bits of each of the codewords by threes. An octal code generator converts the 3-bit grouped binary codewords to octal code sequences.

According to still another aspect of the present invention, in an apparatus for demodulating a cell identification code in an MS in a mobile communication system in which cells are identified using an octal code, an energy calculator calculates the correlation energies of known octal code sequences of all cells by correlating a signal received for a predetermined search time period with the octal code sequences. An octal code selector selects an octal code sequence having the highest of the correlation energies. A cell identifier identifies a serving cell of the MS by comparing the selected octal code sequence with the octal code sequences of all the cells.

According to yet another aspect of the present invention, in a method of generating 256 octal code sequences to identify cells by an octal code of length 15, a [32, 8] second-order Reed-Muller code with a minimum Hamming distance of 12 is generated. A [45, 8] binary code with a minimum Hamming distance of 16 is generated by concatenating the second-order Reed-Muller code to a predetermined code. The order of the columns of the [45, 8] binary code is permuted in a predetermined interleaving pattern. A total of 256 codewords are generated using the column-permuted [45, 8] binary code as a generator matrix. A [15, 256] octal code is generated by grouping the bits of each of the 256 codewords by threes and converting the 3-bit grouped codewords to octal code sequences.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENTS

Figure 1:
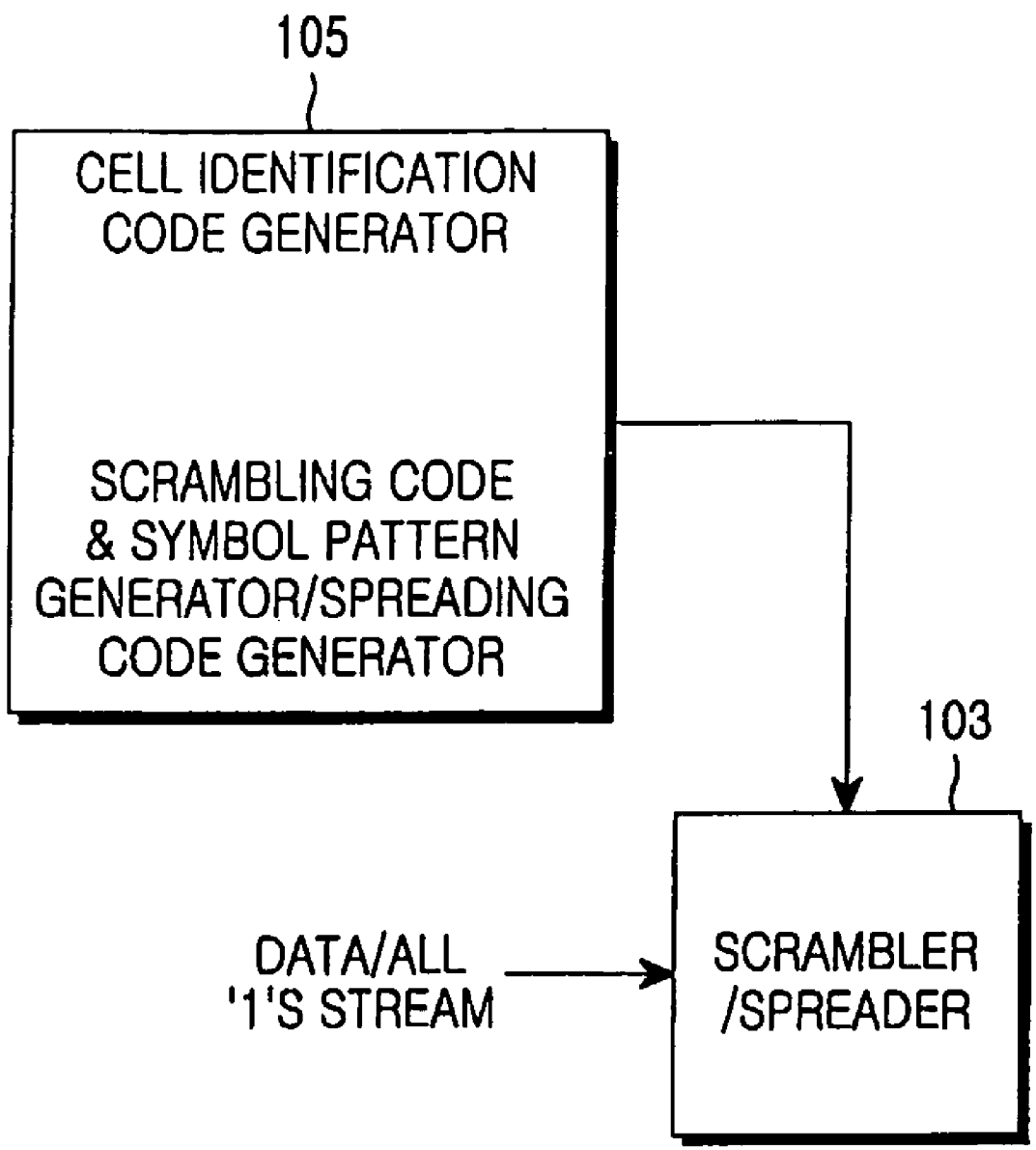
FIG. 1 is a schematic block diagram of an apparatus for transmitting a cell identification code in a Node B.

Preferred embodiments of the present invention will be described herein below with reference to the accompanying drawings. In the following description, well-known functions or constructions are not described in detail since they would obscure the invention in unnecessary detail.

The present invention is intended to provide an apparatus and method for transmitting and receiving a cell identification code having excellent performance in identifying Node Bs in a mobile communication system. The cell identification code is an octal code designed to have an excellent minimum Hamming distance. Due to its robustness against channel-caused errors, the cell identification code improves cell identification performance at a receiver.

A minimum Hamming distance, $d_{min}$ is defined as the number of different elements in two different linear block code sequences, and is a coefficient representing the cross-correlation between linear block codes. As the minimum Hamming distance is larger, the two sequences are more different. Therefore, the detection error probability of the receiver decreases with a larger minimum Hamming distance.

Generation of Cell Identification Code

In accordance with the present invention, an error correction code, for example, an octal code of length 15 is generated as follows.

First, a [45, 8] binary linear code having as large a minimum Hamming distance as possible is generated. Table 1 below shows a [32, 8] second-order Reed-Muller code having a minimum Hamming distance of 12.

TABLE 1

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 0 | 1 | 0 | 1 | 0 | 1 | 0 | 1 | 0 | 1 | 0 | 1 | 0 | 1 | 0 | 1 |
| 0 | 0 | 1 | 1 | 0 | 0 | 1 | 1 | 0 | 0 | 1 | 1 | 0 | 0 | 1 | 1 |
| 0 | 0 | 0 | 0 | 1 | 1 | 1 | 1 | 0 | 0 | 0 | 0 | 1 | 1 | 1 | 1 |
| 0 | 0 | 0 | 0 | 0 | 0 | 0 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 1 | 0 | 0 | 1 | 1 | 0 | 1 | 1 | 0 |
| 0 | 0 | 0 | 0 | 0 | 0 | 0 | 0 | 1 | 0 | 1 | 0 | 1 | 0 | 1 | 0 |
| 1 | 1 | 1 | 1 | 1 | 1 | 1 | 1 | 1 | 1 | 1 | 1 | 1 | 1 | 1 | 1 |
| 0 | 1 | 0 | 1 | 0 | 1 | 0 | 1 | 0 | 1 | 0 | 1 | 0 | 1 | 0 | 1 |
| 0 | 0 | 1 | 1 | 0 | 0 | 1 | 1 | 0 | 0 | 1 | 1 | 0 | 0 | 1 | 1 |
| 0 | 0 | 0 | 0 | 1 | 1 | 1 | 1 | 0 | 0 | 0 | 0 | 1 | 1 | 1 | 1 |
| 0 | 0 | 0 | 0 | 0 | 0 | 0 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 0 | 0 | 0 | 0 | 0 | 1 | 0 | 1 | 0 | 0 | 1 | 1 | 0 | 1 | 1 | 0 |
| 0 | 0 | 1 | 1 | 0 | 0 | 1 | 1 | 0 | 1 | 1 | 0 | 0 | 1 | 1 | 0 |

To generate the [45, 8] linear binary code having a large minimum distance, the second-order Reed-Muller code of Table 1 is concatenated with the codes shown in Table 2 and Table 3 below.

TABLE 2

| 0 | 0 | 0 | 0 |
|---|---|---|---|
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 1 | 0 | 1 |
| 0 | 0 | 1 | 1 |

TABLE 3

| 1 | 0 | 0 | 0 | 0 | 0 | 0 | 0 | 1 |
|---|---|---|---|---|---|---|---|---|
| 0 | 1 | 0 | 0 | 0 | 0 | 0 | 0 | 1 |
| 0 | 0 | 1 | 0 | 0 | 0 | 0 | 0 | 1 |
| 0 | 0 | 0 | 1 | 0 | 0 | 0 | 0 | 1 |
| 0 | 0 | 0 | 0 | 1 | 0 | 0 | 0 | 1 |
| 0 | 0 | 0 | 0 | 0 | 1 | 0 | 0 | 1 |
| 0 | 0 | 0 | 0 | 0 | 0 | 1 | 0 | 1 |
| 0 | 0 | 0 | 0 | 0 | 0 | 0 | 1 | 1 |

The concatenation of the codes shown in Table 1, Table 2, and Table 3 yields a [45, 8, 16] linear binary code.

To further increase the minimum Hamming distance of an octal code equivalent to the [45, 8, 16] binary code, the order of the columns of the [45, 8, 16] binary code is permuted using a block interleaver. After the column permutation, the columns are read out from the block interleaver in the order "1, 43, 22, 15, 36, 8, 29, 7, 28, 21, 42, 14, 35, 4, 25, 18, 39, 11, 32, 3, 45, 24, 17, 38, 10, 31, 6, 27, 20, 41, 13, 34, 2, 44, 23, 16, 37, 9, 30, 5, 26, 19, 40, 12, 33".

The resulting [45, 8] linear binary code still has the same minimum Hamming distance, 16, because of the mere column permutation.

A total of 256 codewords are then generated using the [45, 8, 16] linear binary code as a generator matrix. An information bit stream of length 8 is multiplied by the [45, 8] code column by column, and the resulting 8 codewords are modulo-2 added, yielding one codeword. Accordingly, the 256 codewords are created. The binary digits of each codeword are grouped by threes and replaced by corresponding octal values so that "000" is converted to "0", "001" to "1", "010" to "2", "011" to "3", "100" to "4", "101" to "5", "110" to "6", and "111" to "7". The [45, 256] linear binary code becomes a [15, 256, 10] octal code after the binary-to-octal conversion.

Figure 2:
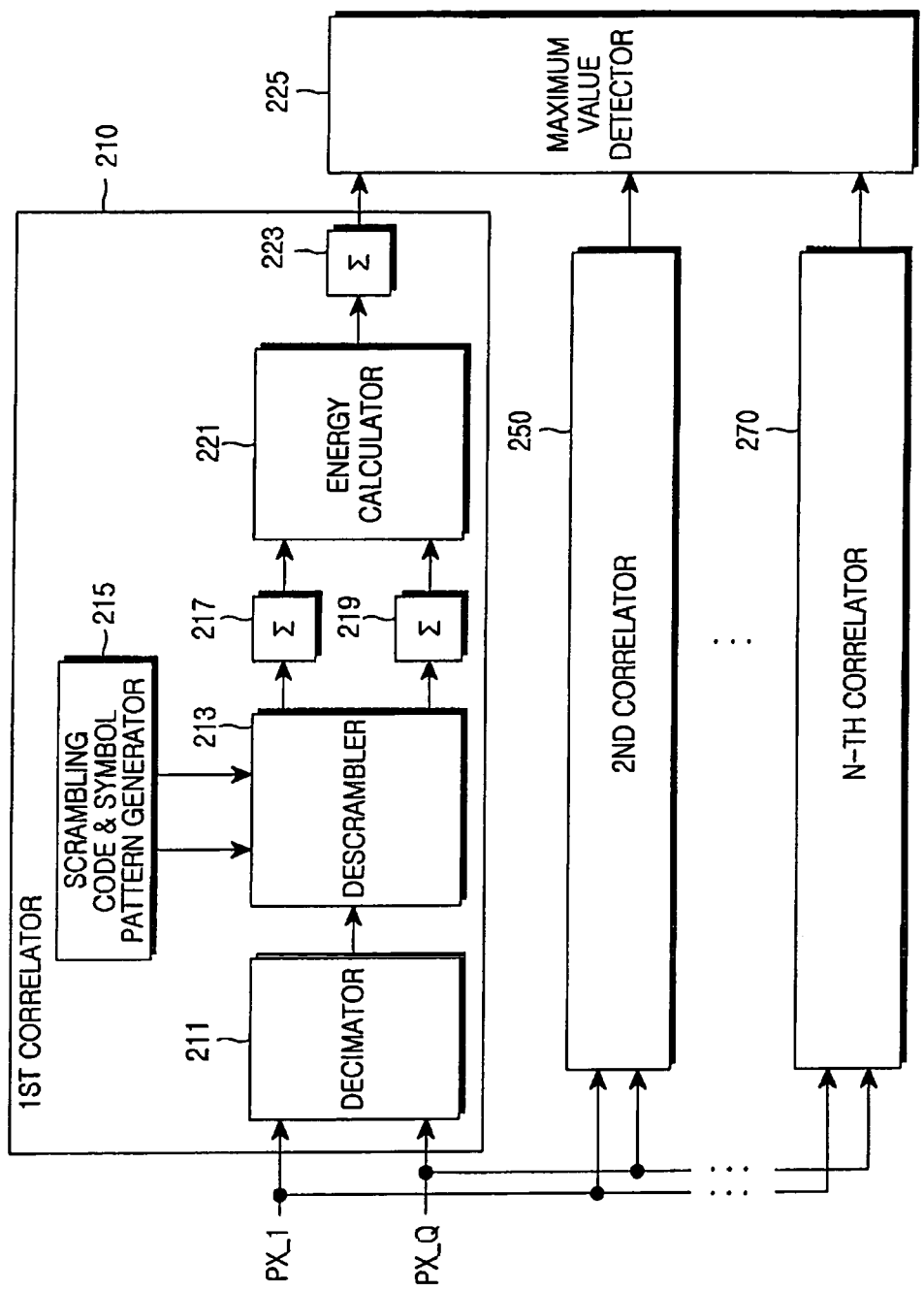
FIG. 2 is a schematic block diagram of an apparatus for receiving a cell identification code in a UE.
Figure 3:
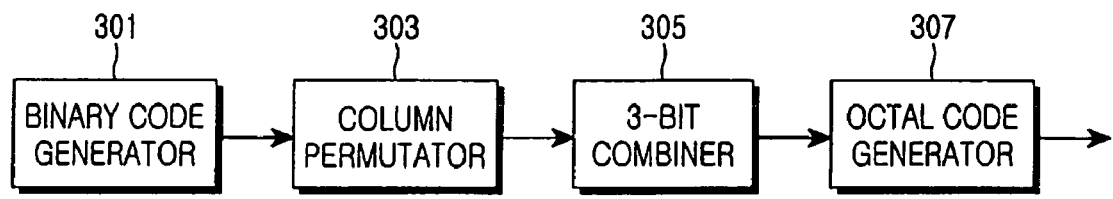
FIG. 3 is a block diagram of an apparatus for generating an octal code according to an embodiment of the present invention.

FIG. 3 is a block diagram illustrating an apparatus for generating an octal code having an excellent minimum Hamming distance according to an embodiment of the present invention. More specifically, in FIG. 3, a code generated is used in the cell identification code generator 105 illustrated in FIG. 1 and the scrambling code & symbol pattern generator 215 illustrated in FIG. 2.

Referring to FIG. 3, a binary code generator 301 sequentially generates linear binary codewords with a predetermined minimum Hamming distance equal to or above 16. Here, a [45, 8, 16] binary code having a minimum Hamming distance of 16 is assumed. Also, it is assumed that a second-order Reed-Muller code is a basis for the [45, 8, 16] binary code.

A column permutator 303 permutes the sequence of the columns, i.e., symbols, of each binary code sequence (codeword) in a predetermined method. The column permutation is intended to eliminate the regularity and instead, increase the randomness between the columns, such that the minimum Hamming distance is increased in equivalent octal codewords.

A 3-bit combiner 305 generates a plurality of codewords using the codewords received from the column permutator 303 as a generator matrix and groups the bits of each codeword by threes. An octal code generator 307 converts the binary code sequences each being grouped into threes to octal code sequences. According to the present invention, the octal code generator 307 produces [15, 256, 10] octal codewords (i.e. code sequences).

The UE has knowledge of the cell identification codes of all Node Bs, and calculates the energies of the respective cell identification codes from a received signal. Typically, each Node B transmits a cell identification code at a higher power level than data and the cell identification code power of a serving Node B is higher than that of a neighboring Node B in the UE. Therefore, the UE identifies its serving Node B by calculating the energies of the cell identification codes and detecting a cell identification code having the highest energy.

Figure 4:
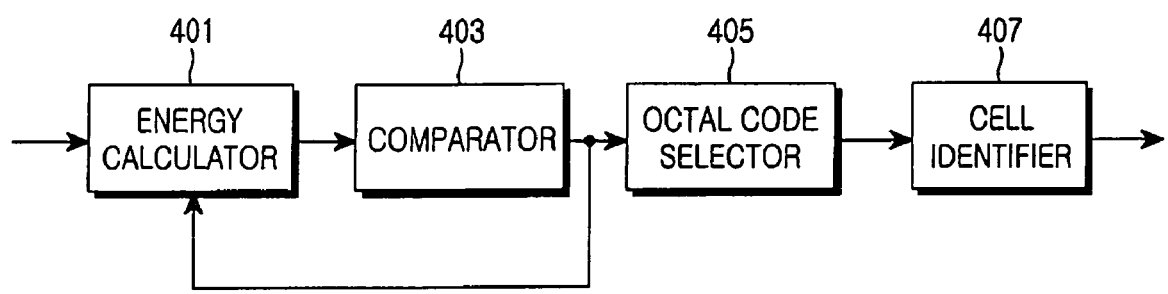
FIG. 4 is a block diagram of an apparatus for demodulating a cell identification code in a UE according to an embodiment of the present invention.

FIG. 4 is a block diagram of an apparatus for demodulating an octal cell identification code in a UE according to an embodiment of the present invention. Referring to FIG. 4, an energy calculator 401 calculates the correlation energies of the cell identification codes of all Node Bs from a received signal for a predetermined search time period. A comparator 403 compares the correlation energies with a predetermined threshold and outputs cell identification codes exceeding the threshold. An octal code selector 405 selects a cell identification code having the highest correlation energy among the cell identification codes above the threshold. A cell identifier 407 identifies the serving Node B by the selected cell identification code (i.e. octal code sequence). If the comparator 403 finds no cell identification code that exceeds the threshold, it notifies the energy calculator 401 of this. The energy calculator 401 then calculates the correlation energies of the cell identification codes for a longer search time period.

Figure 5:
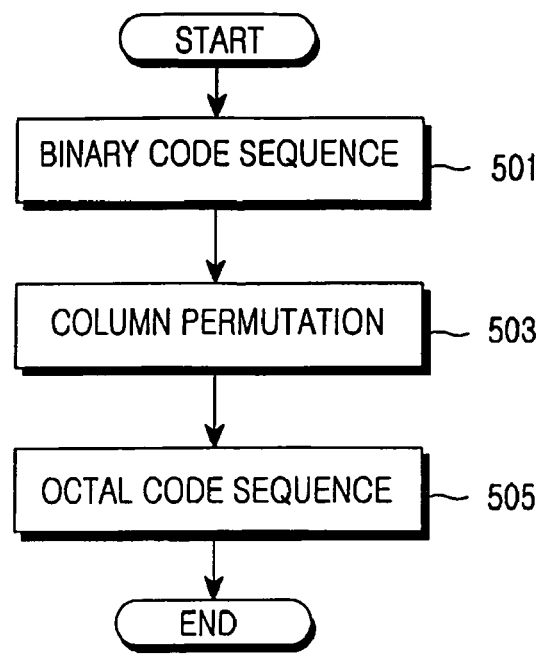
FIG. 5 is a flowchart illustrating a cell identification code generating operation according to an embodiment of the present invention.

FIG. 5 is a flowchart illustrating an operation for generating an octal cell identification code according to an embodiment of the present invention. Referring to FIG. 5, the cell identification code generating apparatus according to the present invention generates a binary code having as large a minimum Hamming distance as possible, equal to or above 16, in step 501. The embodiment of the present invention assumes a [45, 8] binary code with a minimum Hamming distance of 16 based on a second-order Reed-Muller code. In step 503, the cell identification code generating apparatus permutes the sequence of the columns of the binary code in a predetermined method. The column permutation eliminates the inter-column regularity and instead, increases the randomness between the columns in the manner that increases the minimum Hamming distance of an octal code obtained by grouping the bits of the binary code by threes.

After the column permutation, the cell identification code generating apparatus generates 256 codewords using the column-permuted binary code as a generator matrix and converts them to equivalent octal codewords by grouping the bits of each codeword by threes, thereby creating an octal code sequence in step 505. The octal codewords are used as cell identification codes.

Figure 6:
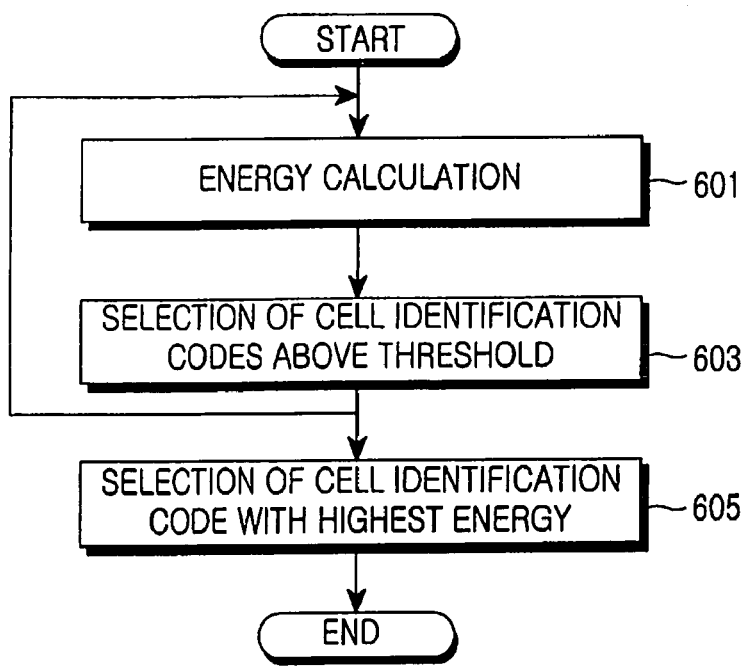
FIG. 6 is a flowchart illustrating a cell identification code demodulating operation according to an embodiment of the present invention.

FIG. 6 is a flowchart illustrating an operation for demodulating an octal cell identification code according to an embodiment of the present invention. Referring to FIG. 6, the cell identification code demodulating apparatus according to the present invention calculates the correlation energies of all known cell identification codes by correlating a signal received for a predetermined search time period with the cell identification codes in step 601. In step 603, the demodulating apparatus compares the correlation energies with a predetermined threshold and selects cell identification codes having correlation energies above the threshold. The demodulating apparatus identifies a serving Node B by selecting a cell identification code having the highest correlation energy in step 605. If none of the correlation energies exceed the threshold in step 603, the demodulating apparatus returns to step 601 in which the search time period is lengthened and the correlation energies of the cell identification codes are again calculated.

A description will be made below of an embodiment of using an octal code of the present invention as a cell identification code in an orthogonal frequency division multiple access-code division multiplexing (OFDMA-CDM) system.

Figure 7:
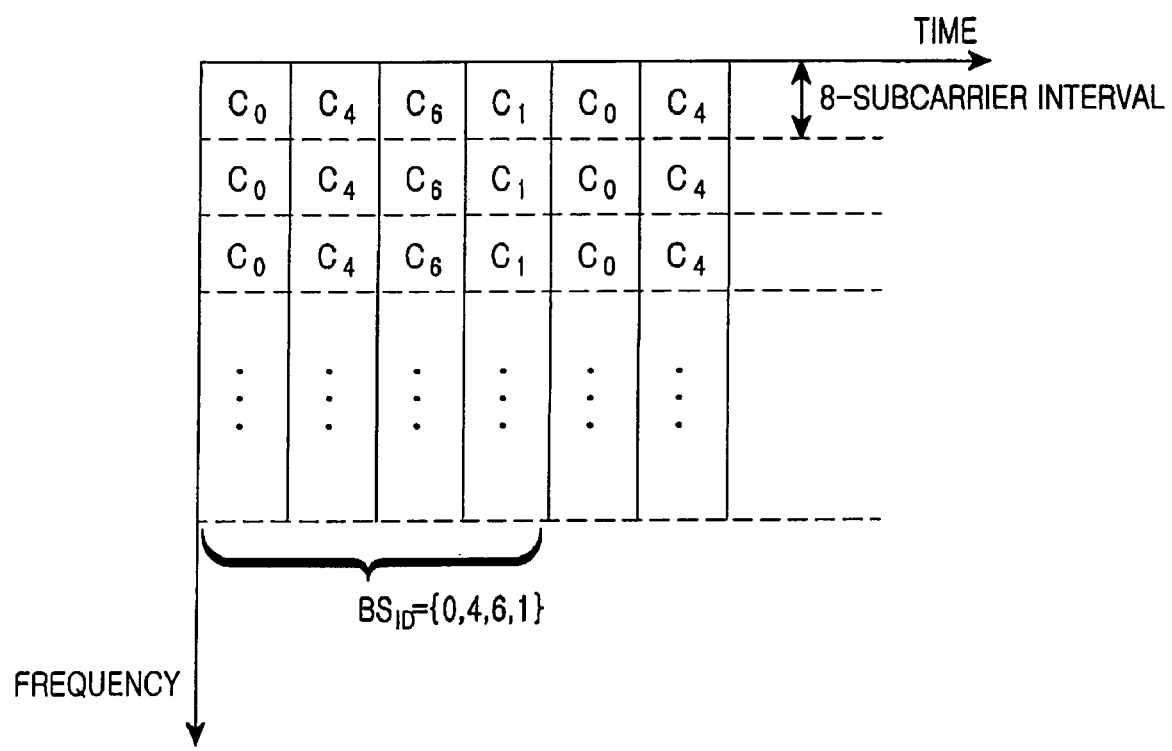
FIG. 7 illustrates resources divided into time-frequency areas in an OFDMA-CDM system.

More specifically, FIG. 7 illustrates resources divided into time-frequency areas in the OFDMA-CDM system. In the illustrated case, orthogonal codes are assigned in correspondence with an octal cell identification code.

Referring to FIG. 7, a unit square represents a time-frequency cell (TFC) defined by a frequency area with a predetermined number of, for example, eight subcarriers and a duration equal to one orthogonal frequency division multiplexing (OFDM) symbol interval. Eight subcarriers are one pilot subcarrier and seven data subcarriers on the frequency axis. In CDM, data and pilots are spread with orthogonal codes. When a cell is identified by pilot subcarriers, different orthogonal codes are used for spreading pilot subcarriers for different cells.

An octal code of the present invention is used in determining orthogonal codes with which pilot subcarriers are spread, e.g., Walsh codes of length 8. Given an octal codeword {0, 4, 6, 1}, a sequence of orthogonal codes for pilot subcarriers is {$C_0, C_4, C_6, C_1$}. A time-frequency area assigned the same orthogonal code is defined as a frame cell (FC) and each FC is assigned an orthogonal code according to an octal codeword as a cell identification code. Because a sequence of orthogonal codes is specific to each Node B, a UE can identify the Node B by acquiring the sequence of orthogonal codes with which pilot subcarriers are spread.

When an octal code is used as a cell identification code in an OFDMA-CDM system as illustrated in FIG. 7, a transmitter in a Node B and a receiver in a UE operate as described below.

Figure 8:
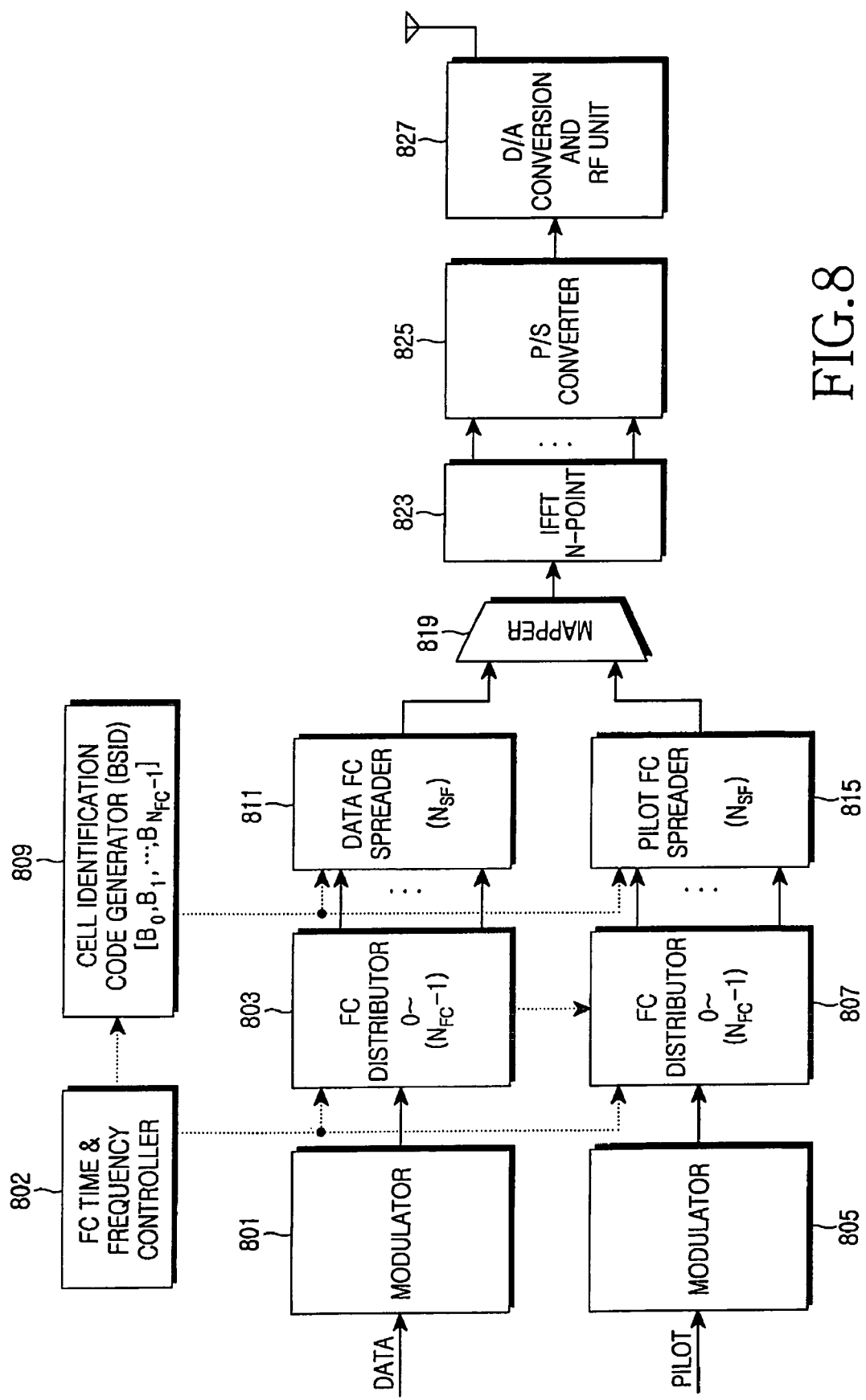
FIG. 8 is a block diagram of a Node B transmitter in an OFDMA-CDM system according to an embodiment of the present invention.

FIG. 8 is a block diagram of a transmitter in a Node B in an OFDMA-CDM system according to an embodiment of the present invention. Referring to FIG. 8, a modulator 801 encodes input transmission data at a predetermined code rate and modulates the coded data according to a predetermined modulation order. An FC time & frequency controller 802 outputs to an FC distributor 803 a control signal representing frequency and time information for use in mapping the output of the modulator 801 to a particular FC. Besides the FC mapping, the FC time & frequency controller 802 can control TFC mapping.

The FC distributor 803 maps the output of the modulator 801 to a corresponding FC under the control of the FC time & frequency controller 802. For example, the FC distributor 803 sequentially outputs the transmission data on an FC basis, each FC covering the entire frequency band.

A pilot modulator 805 modulates input pilot data according to a predetermined modulation order. An FC distributor 807 maps the output of the pilot modulator 805 to the FC under the control of the controller 802.

A cell identification code generator 809 generates, as a cell identification code, a sequence assigned to the Node B, [$B_0, B_1, \ldots, B_{N_{FC}-1}$]$_{(8)}$, one of octal codewords (or octal code sequences) created in the manner described before. According to the present invention, the cell identification code is one of the codewords of the [15, 256, 10] octal code. The cell identification code generator 809 is synchronized to a predetermined timing, e.g., frame start, and sequentially generates the elements $B_i$ of the octal code sequence at intervals of an FC duration under the control of the FC time & frequency controller 802. Herein, $B_i$ represents the number of an orthogonal code used for an $i^{th}$ FC.

A data FC spreader 811 spreads the data received from the FC distributor 803 with all other orthogonal codes than the orthogonal code corresponding to the number generated from the cell identification code generator 809. For the $i^{th}$ FC, the data FC spreader 811 spreads the data with the other orthogonal codes than the orthogonal code indicated by $B_i$. Given an SF of 8, eight subcarriers form one TFC, and one of eight orthogonal codes is used for a pilot channel and the other seven codes for data channels. Therefore, the data FC spreader 811 groups the outputs of the FC distributor 803 into sevens and spread each of the data groups with the seven orthogonal codes.

However, a pilot FC spreader 815 spreads the data received from the FC mapper 807 with the orthogonal code corresponding to the number generated from the cell identification code generator 809 and controls the gain of the spread pilot signal to be higher than that of the spread data signal because of the importance that pilot detection has to a receiver. For the $i^{th}$ FC, the pilot FC spreader 815 spreads pilot symbols with the orthogonal code indicated by $B_i$.

A mapper 819 groups the spread signals from the data FC spreader 811 and the spread signals from the pilot FC spreader 815 on a TFC basis and outputs the signals of each TFC in correspondence with predetermined subcarrier positions. The TFC-based grouping is a process that includes acquiring eight chip data by adding a spread pilot signal and spread data signals mapped to a TFC at a chip level. Because pilots in one FC are spread with the same orthogonal code, the pilot FC spreader 815 can generate one spread pilot signal per FC. Also, the mapper 819 can group the spread pilot and data signals in such a manner that the pilot spread signal is assigned to all TFCs or predetermined TFCs within an FC according to a predetermined hopping pattern.

An inverse fast Fourier transform (IFFT) processor 823 N-point IFFT-processes the data received from the mapper 819, for OFDM modulation. Here, N is the number of the subcarriers in the total frequency band.

A parallel-to-serial (P/S) converter 825 serializes the IFFT signals. An analog-to-digital (A/D) conversion & radio frequency (RF) unit 827 converts the digital serial signal from the P/S converter 825 to an analog signal, upconverts the baseband analog signal to an RF signal, and transmits the RF signal through an antenna.

Figure 9:
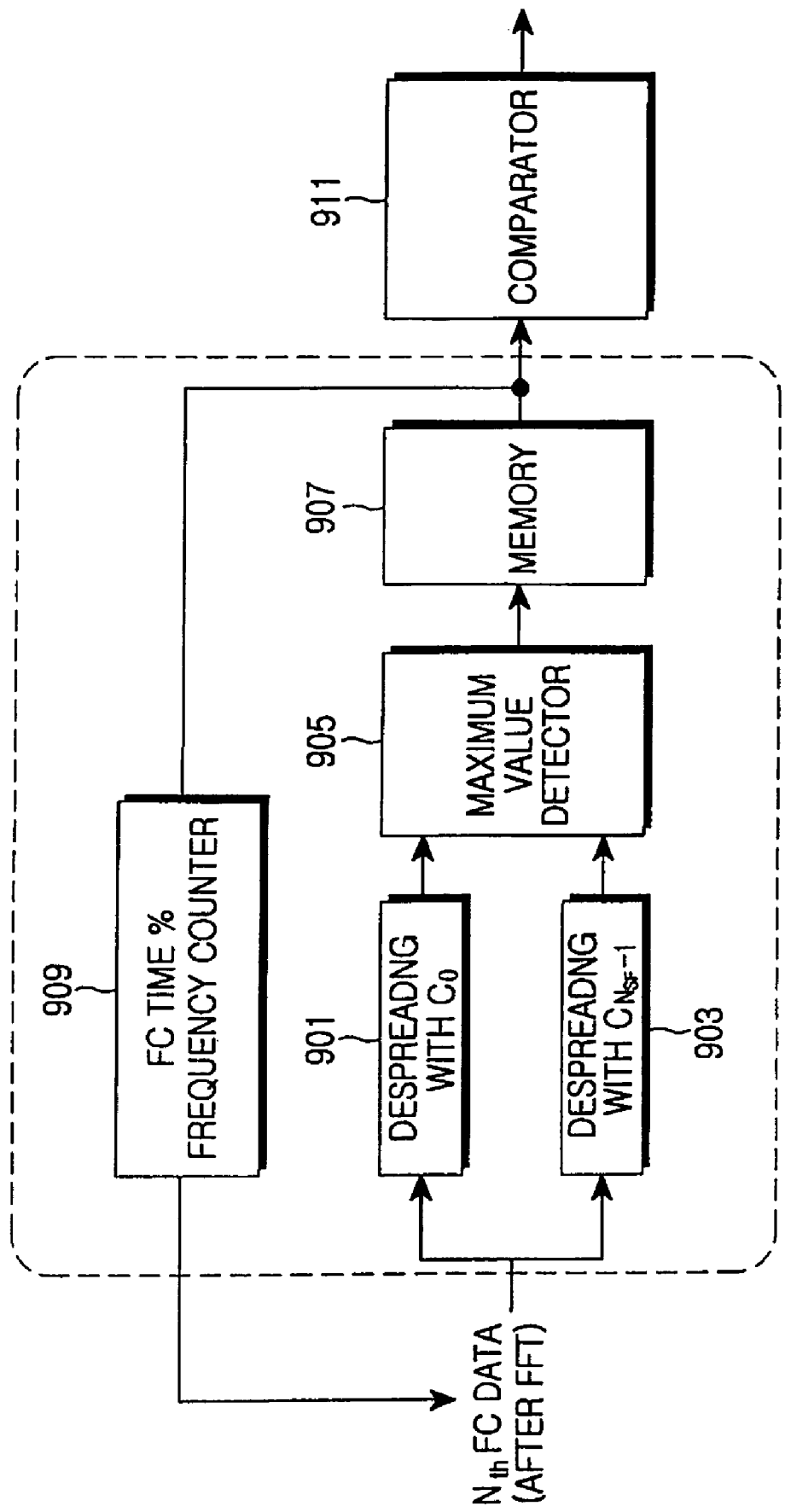
FIG. 9 is a block diagram of a cell identification code demodulating apparatus in a UE in the OFDMA-CDM system according to an embodiment of the present invention.

FIG. 9 is a block diagram of an apparatus for demodulating a cell identification code in a UE in the OFDMA-CDM system according to an embodiment of the present invention. Referring to FIG. 9, an FC time & frequency counter 909 counts the number of received FCs and sequentially provides the TFCs of each FC received from a fast Fourier transform (FFT) processor (not shown) to despreaders 901 to 903. That is, the FC time & frequency counter 909 operates so that the received signal can be processed on an FC basis. The number of the despreaders 901 to 903 is equal to that of the subcarriers per TFC.

Upon receiving the data of FC #0, the data of the TFCs within FC #0 is sequentially provided to the $C_0$ despreader 901 to the $C_{N_{SF}-1}$ despreader 903. FC #0 can be detected by acquiring a predetermined preamble signal. If one FC has 160 TFCs, the data (8-chip data) of the first TFC is provided to the despreaders 901 to 903 and then the data of the second, third, $\ldots$, $160^{th}$ TFCs is sequentially provided to the despreaders 901 to 903. The despreaders 901 to 903 despread received TFC data with given orthogonal codes. More specifically, despreader #0 despreads the received data with orthogonal code #0, $C_0$ and despreader #7 despreads the received data with orthogonal code #7, $C_{N_{SF}-1}$.

A maximum value detector 905 accumulates the despread symbols received from the despreaders 901 to 903 on an orthogonal code basis and detects the largest of the eight symbol accumulation values when one FC is completely despread. The maximum value detector 905 then identifies the number of an orthogonal code having the largest symbol accumulation value, i.e., the orthogonal code used for despreading in a corresponding despreader, as used for a pilot and stores it in a memory 907. A symbol with the largest symbol accumulation value is selected as a pilot symbol because the pilot is transmitted at a higher signal level than data. The number of an orthogonal code stored in the memory 907 is assumed to be $B_0$.

Accordingly, the orthogonal code number of a pilot channel obtained from each FC is stored in the memory 907. When the FC time & frequency counter 909 counts the index of the last FC for cell identification, the memory 907 outputs an octal code sequence with the stored orthogonal code numbers, $[B_0, B_1, \ldots, B_{N_{FC}-1}]_{(8)}$ to a comparator 911. The comparator 911 identifies the Node B by comparing the octal code sequence with all known cell identification codes (octal code sequences) and notifies an upper-layer controller (not shown) of the identified Node B.

The above octal code used as a cell identification code in the OFDMA-CDM system is excellent in terms of minimum Hamming distance that despite errors on a channel, it offers a low detection error probability in the receiver.

In accordance with the present invention as described above, an octal code is designed to maximize the minimum Hamming distance as a cell identification code in a mobile communication system, such that a demodulator in a UE can correct errors caused by a channel that delivers the cell identification code. Due to its large auto-correlation, therefore, the inventive cell identification code improves cell identification performance.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. An apparatus for transmitting a cell identification code in a base station (BS) in a broadband mobile communication system in which cells are identified using an octal code, comprising:
   a code generator for sequentially generating a plurality of orthogonal codes in accordance with an octal code sequence assigned to the BS, wherein there is one orthogonal code per predetermined transmission unit;
   a spreader for spreading an input pilot symbol with an orthogonal code generated from the code generator;
   a mapper for allocating the spread pilot symbol from the spreader to a subcarrier; and
   an inverse fast Fourier transform (IFFT) processor for orthogonal frequency division multiplexing (OFDM)-modulating the pilot symbol assigned to the subcarrier by IFFT-processing the pilot symbol.

2. The apparatus of claim 1, wherein the octal code has a minimum Hamming distance equal to or above 10, generated using a linear binary code with a minimum Hamming distance equal to or above 16 as a generator matrix.

3. The apparatus of claim 1, wherein the octal code is a [15, 256, 10] octal code produced by generating a [45, 256] binary code using a [45, 8, 16] linear binary code as a generator matrix and grouping bits of each code sequence of the [45, 256] binary code by threes.

4. The apparatus of claim 1, wherein the orthogonal codes are Walsh codes of length 8.

5. A method of transmitting a cell identification code in a base station (BS) in a broadband mobile communication system in which cells are identified using an [n,k] octal code, where n indicates a length of octal code sequences and k indicates a number of the octal code sequences, comprising the steps of:
   sequentially generating a plurality of orthogonal codes in accordance with an octal code sequence assigned to the BS, wherein there is one orthogonal code per predetermined transmission unit;
   spreading an input pilot symbol with one of the orthogonal codes;
   allocating the spread pilot symbol to a subcarrier; and
   orthogonal frequency division multiplexing (OFDM)-modulating the pilot symbol assigned to the subearrier by inverse fast Fourier transform (IFFT) processing the pilot symbol.

6. The method of claim 5, wherein the octal code has a minimum distance equal to or above 10, generated using a linear binary code with a minimum distance equal to or above 16 as a generator matrix.

7. The method of claim 5, wherein the octal code is a [15, 256, 10] octal code produced by generating a [45,256] binary code using a [45, 8, 16] linear binary code as a generator matrix and grouping bits of each code sequence of the [45, 256] binary code by threes.

8. The method of claim 6, wherein the predetermined transmission unit is a frame cell (FC) defined by a predetermined frequency area and a predetermined time area.

* * * * *